United States Patent
Ogawa et al.

(10) Patent No.: US 6,782,553 B1
(45) Date of Patent: Aug. 24, 2004

(54) APPARATUS AND METHOD FOR TRANSPORTING INFORMATION ABOUT BROADCAST PROGRAMS

(75) Inventors: Michiyo Ogawa, Tokyo (JP); Yoshiaki Kato, Tokyo (JP); Tokumichi Murakami, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/258,826

(22) Filed: Feb. 26, 1999

(30) Foreign Application Priority Data

Mar. 5, 1998 (JP) .......................................... 10-053867

(51) Int. Cl.⁷ .............................. H04N 7/16; H04J 3/00
(52) U.S. Cl. ...................... 725/146; 725/144; 725/91; 725/114; 725/93; 725/116; 725/138; 370/474
(58) Field of Search .............................. 725/93, 94, 98, 725/91, 92, 95, 114–117, 135, 138, 144–147; 370/270, 474, 485, 486, 487, 537, 428, 461, 462; 340/825.5, 825.51, 825.52

(56) References Cited

U.S. PATENT DOCUMENTS

| | | | |
|---|---|---|---|
| 5,448,568 A | | 9/1995 | Delpuch et al. |
| 5,515,106 A | | 5/1996 | Chaney et al. |
| 5,559,808 A | * | 9/1996 | Kostreski et al. ............ 370/108 |
| 5,666,645 A | | 9/1997 | Thomas et al. |
| 5,844,595 A | * | 12/1998 | Blatter et al. ................. 455/83 |
| 5,886,995 A | * | 3/1999 | Arsenault et al. ............ 370/477 |
| 6,233,255 B1 | * | 5/2001 | Kato et al. .................... 370/486 |
| 6,271,893 B1 | * | 8/2001 | Kawaguchi et al. ......... 348/725 |
| 6,347,098 B1 | * | 2/2002 | Ejiri ............................. 370/532 |
| 6,351,471 B1 | * | 2/2002 | Robinett et al. ............. 370/486 |
| 6,351,474 B1 | * | 2/2002 | Robinett et al. ............. 370/486 |
| 6,385,212 B1 | * | 5/2002 | Baba et al. ................... 370/506 |
| 6,414,720 B1 | * | 7/2002 | Tsukidate et al. ............ 348/469 |

FOREIGN PATENT DOCUMENTS

| | | |
|---|---|---|
| EP | 0 743 795 A2 | 11/1996 |
| JP | 6-169448 | 6/1994 |
| JP | 8-511140 | 11/1996 |
| JP | 9-224230 | 8/1997 |
| JP | 11-163814 | 6/1999 |

* cited by examiner

Primary Examiner—John Miller
Assistant Examiner—Annan Q. Shang
(74) Attorney, Agent, or Firm—Birch, Stewart, Kolasch & Birch, LLP

(57) ABSTRACT

A program information transport apparatus comprises a update unit for accepting a request for a change in either one of program information and transmission control information stored in a memory, and for updating the contents of the memory according to the change at predetermined update times to update the program information. An information management unit can acquire the program information from the memory and then furnish the acquired program information at predetermined transport times to transport the program information. A transport unit then transports the program information from the information management unit to receivers.

10 Claims, 10 Drawing Sheets

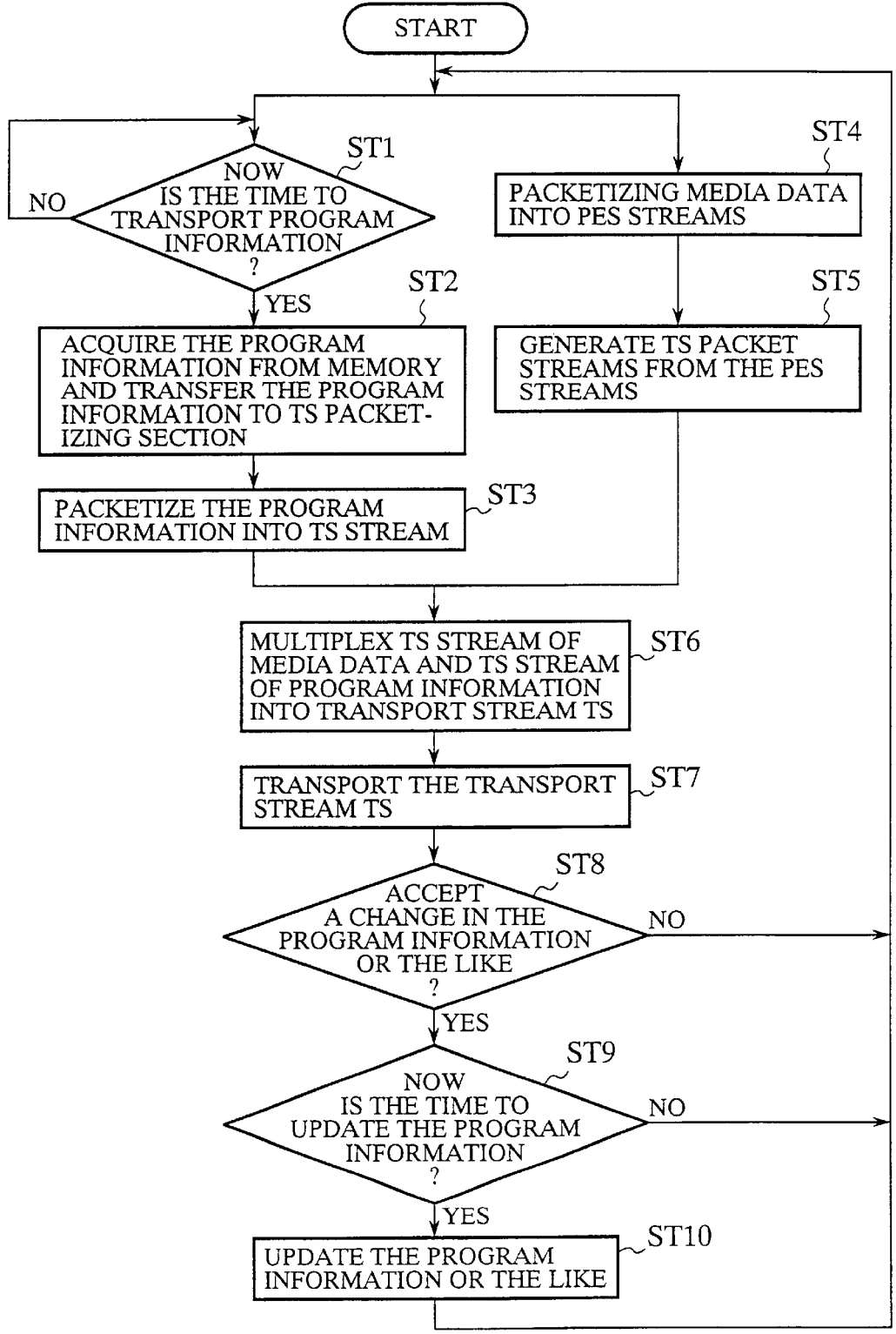

FIG.3

PLAY LIST

| 1998.1.30 | CHANNEL M | CHANNEL N | CHANNEL Q |
|---|---|---|---|
| 10:00 | TITLE: NEWS M<br>SOURCE NO.:<br>  AUDIO  0001 (AC-3)<br>  VIDEO  0012<br>  DATA  —<br>... | TITLE: MOVIE 1<br>SOURCE NO.:<br>  AUDIO  1001<br>  VIDEO  1012<br>  DATA  1032<br>... | TITLE: SPORTS NEWS<br>SOURCE NO.:<br>  AUDIO  2001<br>  VIDEO  2012<br>  (INCLUDING CLOSED CAPTION)<br>  DATA  1032<br>... |
| 11:00 | TITLE: MOVIE M<br>SOURCE NO.:<br>  AUDIO  0002 (MPEG)<br>  VIDEO  0014<br>  DATA  0038<br>... | | NO PROGRAM |
| 12:00 | ... | ... | NO PROGRAM |
| 20:00 | TITLE: DRAMA M<br>SOURCE NO.:<br>  AUDIO  0009<br>  VIDEO  0018<br>  (INCLUDING CLOSED CAPTION)<br>  DATA  —<br>... | TITLE: DRAMA N<br>SOURCE NO.:<br>  AUDIO  1009<br>  VIDEO  1013<br>  DATA  —<br>... | ... |
| 21:00 | ... | | |
| 22:00 | ... | | |
| 23:00 | ... | | |

FIG.4

| TABLE NAME | PAT | PMT (CHANNEL M) | PMT (CHANNEL N) | PMT (CHANNEL Q) | MGT | EIT-0 | ⋮ |
|---|---|---|---|---|---|---|---|
| SWITCHING TIMING (UPDATE TIME) | 0:00<br>1:00<br>3:00<br>⋮<br>20:00<br>21:00<br>22:00<br>23:00 | 0:00<br>1:00<br>3:00<br>⋮<br>20:00<br>21:00<br>22:00<br>23:00 | 0:00<br>3:00<br>⋮<br>20:00<br>21:00 | 0:00<br>1:00<br>⋮<br>20:00<br>21:00 | EVERY THREE HOURS | EVERY THREE HOURS | ⋮ |
| TRANSPORT CYCLE TIME (msec) | 100 | 400 | 350 | 400 | 150 | 500 | ⋮ |
| TRANSPORT PRIORITY | 0 | 2 | 1 | 2 | 3 | 5 | ⋮ |

PAT : Program Association Table (MPEG-2Systems Definition)
PMT : Program Map Table (MPEG-2Syatems Definition)
MGT : Master Guide Table (ATSC STANDARD PSIP)
EIT : Event Information Table (ATSC STANDARD PSIP)

FIG.5

| TABLE NAME | ADDRESS SPECIFYING MEMORY LOCATION | TRANSPORT START TIME | TRANSPORT END TIME | TRANSPORT CYCLE TIME (msec) | TRANSPORT PRIORITY |
|---|---|---|---|---|---|
| PAT | 0x12340000 | 10:00 | -1 (INFINITY) | 100 | 0 |
| PMT ( CHANNEL M ) | 0x12340200 | 10:30 | -1 (INFINITY) | 400 | 2 |
| PMT ( CHANNEL Q ) | 0x12340400 | 10:00 | 11:00 | 400 | 2 |
| ... | ... | | | | |
| STT | 0x12340600 | 10:00 | -1 (INFINITY) | 1000 | 1 |
| MGT | 0x12340700 | 12:00 | 15:00 | 150 | 3 |
| ... | ... | | | | |
| EIT-0 | 0x12341000 | 12:00 | 15:00 | 500 | 10 |
| EIT-1 | 0x12342000 | 12:00 | 18:00 | 500 | 11 |
| ... | ... | | | | |

APPARATUS AND METHOD FOR TRANSPORTING INFORMATION ABOUT BROADCAST PROGRAMS

BACKGROUND OF THE INVENTION

1. Field of the Invention

The present invention relates to a program information transport apparatus and a method for transporting program information about digital broadcast programs.

2. Description of the Prior Art

Referring now to FIG. 10, there is illustrated a block diagram showing the structure of a prior art program information transport apparatus. In the figure, reference numeral 1 denotes a PES (Packetized Elementary Stream)/TS (Transport Stream) packetizing unit for packetizing media data such as coded video data, coded audio data, and coded other data so as to generate a plurality of PES streams (each PES is a stream of frames), and for TS-packetizing the plurality of PES streams into a plurality of fixed-length TS packet streams, 2 denotes a memory for storing program information including program specific information (PSI) and the transport cycle time for the program information, 3 denotes a TS packetizing unit for acquiring the program information from the memory 2 at predetermined transport times to start transport of program information, the predetermined transport times being preset based on the transport cycle time, and for packetizing the program information into a stream of TS packets from the acquired program information from the memory 2, and 4 denotes a TS packet multiplexor for multiplexing the TS-packetized media data from the PES/TS packetizing unit 1 and the TS-packetized program information from the TS packetizing unit 3 into a single output stream for transmission, called transport stream (TS).

In operation, in accordance with ITU-T Rec. H.220.0|ISO/IEC 13818-1 (MPEG-2 Systems), the sender of a digital broadcast has to multiplex program specific information PSI and media data into a single output stream. The program specific information PSI is the one needed for receivers to demultiplex the single output stream from the sender into the program information and the media data. The program specific information PSI is divided into four tables including indispensable tables and optional tables. The program specific information PSI is constructed from a program association table or PAT and a program map table or PMT.

When the PES/TS packetizing unit 1 receives media data such as coded video data, coded audio data, and coded other data, it generates PES streams for audio, video, and other data, and after that, generates a plurality of fixed-length TS packet streams from those PES streams so as to transmit the plurality of fixed-length packets over transmission paths. On the other hand, the TS packetizing unit 3 acquires the program information including the program specific information PSI from the memory 2 at the predetermined transport times to start transport of program information (e.g., at predetermined intervals of 100 msec after the packetizing process is started), which are preset based on the transport cycle time for the program information, so as to generate a stream of TS packets from the acquired program information from the memory 2.

After the PES/TS packetizing unit 1 furnishes the plurality of TS-packetized media data streams and the TS packetizing unit 3 furnishes the stream of TS-packetized program information, the TS packet multiplexor 4 multiplexes them into a single output, i.e. a transport stream TS and then sends out the transport stream TS. This technique of multiplexing media data and program information into a single output stream for transmission is disclosed in, for example, Japanese Patent Application Publication (KOKAI) No. 9-284238.

A problem with the prior art program information transport apparatus so constructed as mentioned above is thus that although the prior art apparatus can multiplex program information and media data into a single output stream for transmission, when there is a change in the contents of any one of digital broadcast programs it needs to suspend the process of multiplexing the program information and media data, and then modify the contents of the memory 2 because it cannot accept the change while continuing to perform the process of multiplexing the program information and media data, whereby forcing the multiplexor to suspend the process of multiplexing the program information and media data until the process of modifying the contents of the memory 2 is complete.

SUMMARY OF THE INVENTION

The present invention is made to overcome the above problem. It is therefore an object of the present invention to provide a program information transport apparatus and a method for transporting program information about digital broadcast programs, capable of modifying the program information or the like while continuing to perform the process of multiplexing the program information and media data into a single output stream for transmission.

In accordance with one aspect of the present invention, there is provided a program information transport apparatus comprising: a storage unit for storing program information about digital broadcast programs as well as transmission control information including a transport cycle time for the program information; a update unit for accepting a request for a change in either one of the program information and transmission control information stored in the storage unit, and for updating the contents of the storage unit according to the change at predetermined update times to update the program information; an information management unit for acquiring the program information from the storage unit and then furnishing the acquired program information at predetermined transport times to transport the program information, the predetermined transport times being preset based on the transport cycle time stored in the storage unit; and a transport unit for transporting the program information from the information management unit to outside the program information transport apparatus.

Preferably, the transport unit multiplexes the program information from the information management unit and media data into a single output stream, and then transports the single output stream.

The storage unit can store, as the transmission control information, predetermined update times to update the program information, a transport start time to start transport of the program information, a transport end time to finish transport of the program information, and a transport priority assigned to the program information. Further, the update unit can accept a request for a change in either one of the predetermined update times, the transport start time, the transport end time, and the transport priority, which are stored in the storage unit.

Preferably, the information management unit starts to transfer the program information to the transport unit after the transport start time for the program information.

Preferably, the information management unit can also finish transferring the program information to the transport unit after the transport end time for the program information. The information management unit can also erase the program information from the storage unit after the transport end time for the program information.

Preferably, the storage unit stores a plurality of pieces of program information, the information management unit sequentially transfers the plurality of pieces of program information to the transport unit in order of transport priority if some of the plurality of pieces of program information have to be transported at the same transport times.

In accordance with a preferred embodiment of the present invention, the program information transport apparatus further includes an extracting unit for extracting program information from multiplexed data, into which media data and the program information are multiplexed, transported thereto from outside the apparatus. Further, the storage unit can further store program information that is the same as program information previously-extracted by the extracting unit until the extracting means extracts the current program information. The storage unit can also store a transport cycle time for the program information. The program information transport apparatus can further include a second update unit for determining whether or not there is a change in the extracted program information by comparing the extracted program information with the previous program information stored in the storage unit, and for updating the contents of the storage unit according to the program information extracted by the extracting unit only if there is a change in the extracted program information. The information management unit also acquires the program information from the storage unit and then furnishes the acquired program information to the transport unit at predetermined transport times to transport the program information, the predetermined transport times being preset based on the transport cycle time stored in the storage unit.

In accordance with another aspect of the present invention, there is provided a program information transport apparatus comprising: an extracting unit for extracting program information from multiplexed data, into which media data and the program information are multiplexed, transported thereto from outside the apparatus; a storage unit for storing program information, which is the same as previously-extracted program information, until the extracting means extracts the current program information, and for storing a transport cycle time for the program information; a update unit for determining whether or not there is a change in the program information extracted by the extracting unit by comparing the extracted program information with the previous program information stored in the storage unit, and for updating the previous program information stored in the storage unit according to the program information extracted by the extracting unit, only if there is a change in the extracted program information; an information management unit for acquiring the program information from the storage unit and then furnishing the acquired program information at predetermined transport times to transport the program information, the predetermined transport times being preset based on the transport cycle time; and a transport unit for transporting the program information transferred thereto from the information management unit to outside the program information transport apparatus.

In accordance with another aspect of the present invention, there is provided a method of transporting program information, comprising the steps of: prestoring program information about digital broadcast programs and transmission control information including a transport cycle time for the program information in a memory; accepting a request for a change in either one of the program information and the transmission control information stored in the memory; updating the contents of the memory according to the change at predetermined update times to update the program information; acquiring the program information from the memory and then multiplexing the acquired program information and media data into an output stream at predetermined transport times to transport the program information, the predetermined transport times being preset based on the transport cycle time; and transporting the output stream to outside.

In accordance with another aspect of the present invention, there is provided a method of transporting program information transport, comprising the steps of: extracting program information from multiplexed data, into which media data and the program information are multiplexed, transported thereto from outside, storing program information, which is the same as previously-extracted program information, in a memory until the current program information is extracted from the multiplexed data, and storing a transport cycle time for the program information in the memory; determining whether or not there is a change in the program information by comparing the extracted program information with the previous program information; updating the contents of the memory according to the extracted program information, only if there is a change in the program information; acquiring the program information from the memory and then furnishing the acquired program information at predetermined transport times to transport the program information, the predetermined transport times being preset based on the transport cycle time; and transporting the program information to outside.

Further objects and advantages of the present invention will be apparent from the following description of the preferred embodiments of the invention as illustrated in the accompanying drawings.

BRIEF DESCRIPTION OF THE DRAWINGS

FIG. 2 is a flow diagram showing the operation of the program information transport apparatus and a method of transporting program information according to a first embodiment of the present invention;

FIG. 3 is a table showing an example of the program information;

FIG. 4 is a table showing an example of transmission control information;

FIG. 5 is a table showing an information control table;

DETAILED DESCRIPTION OF THE PREFERRED EMBODIMENTS

First Embodiment

Figure 1:
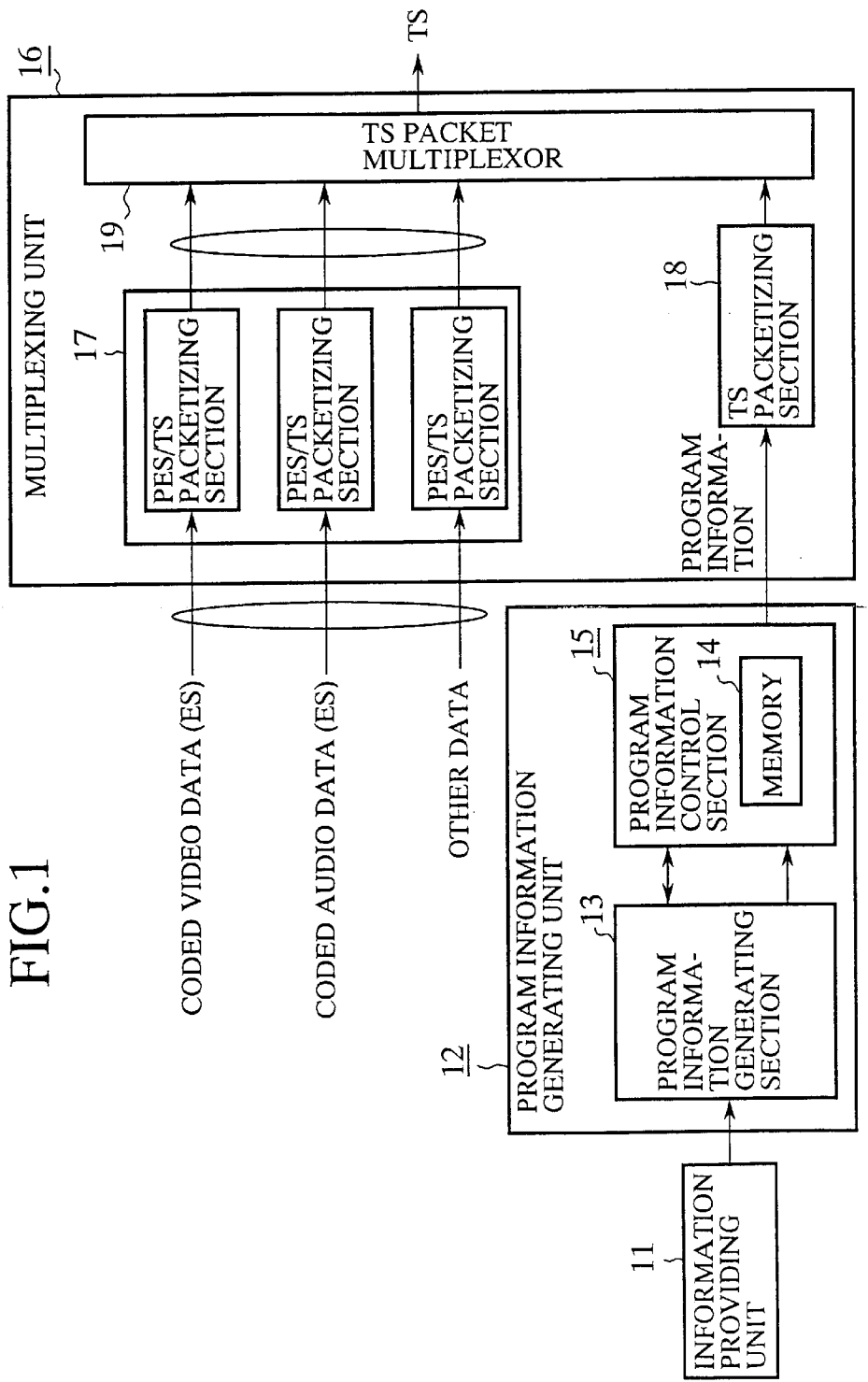
FIG. 1 is a block diagram showing the structure of a program information transport apparatus according to a first embodiment of the present invention.

Referring next to FIG. 1, there is illustrated a block diagram showing the structure of a program information transport apparatus according to a first embodiment of the present invention. In the figure, reference numeral 11 denotes an information providing unit for managing pieces of program information each about one channel, each including program specific information PSI, and pieces of transmission control information each including a transport cycle time for each piece of program information, update times for each piece of program information, a transport start time to start transport of each piece of program information, a transport end time to finish transport of each piece of program information, and a transport priority assigned to each piece of program information, for accepting a change in either each piece of program information or each piece of transmission control information, and for providing or notifying a program information generating unit 12 of the change, 13 denotes a program information generating section of the program information generating unit 12, for converting the notified change in either the program information or the transmission control information into a transport format (i.e., data in the section-type format defined by MPEG-2 Systems), which is defined by either an American ATSC Standard (Program and System Information Protocol for Terrestrial and Cable) or a Japanese ARIB standard (which defines program arrangement information for use with digital broadcasts), 14 denotes a memory for storing both the plural pieces of program information and the plural pieces of transmission control information, and 15 denotes a program information control section for referring to the predetermined update times for each piece of program information, part of which is the one that has been changed and converted in the transport format by the program information generating section 13, or which is associated with the changed piece of transmission control information converted in the transport format, for storing (or overwriting) the change converted in the transport format in either the program information or the transmission control information in the memory 14 at the next predetermined update time for the program information, and for acquiring each piece of program information from the memory 14 at predetermined transport times for each piece of program information, which are preset based on the corresponding transport cycle time stored in the memory 14, and then transferring each piece of program information to a TS packetizing section 18. The TS packetizing section 18 generates a stream of TS packets from the acquired program information from the memory 114.

In addition, reference numeral 16 denotes a multiplexing unit, 17 denotes a PES (Packetized Elementary Stream)/TS (Transport Stream) packetizing section for packetizing media data such as coded video data, coded audio data, and coded other data so as to generate a plurality of PES streams, and for generating a plurality of TS packet streams from those PES streams, and 19 denotes a TS packet multiplexor for multiplexing the TS-packetized media data from the PES/TS packetizing section 17 and the TS-packetized program information from the TS packetizing section 18 into a transport stream TS for transmission, and for transporting the transport stream TS to outside the apparatus.

Referring next to FIG. 2, there is illustrated a flow diagram showing the operation of the program information transport apparatus, and a method of transporting program information according to the first embodiment of the present invention.

The memory 14 of the program information control unit 15 stores pieces of program information each about one channel (see FIG. 3) including program specific information PSI, and pieces of transmission control information (see FIGS. 4 and 5) each including a transport cycle time for each piece of program information, update times for each piece of program information, a transport start time to start transport of each piece of program information, a transport end time to finish transport of each piece of program information, a transport priority assigned to each piece of program information, and an address specifying a memory location where the top of each piece of program information is stored. When the next transport time for each piece of program information comes, which is preset based on the corresponding transport cycle time stored in the memory 14, in step ST1, the program information control section 15, in step ST2, acquires each piece of program information from the memory 14 and then transfers the program information to the TS packetizing section 18.

For example, since the transport cycle time for the program information about channel M is set to 400 msec and the transport start time to start transport of the program information is set to 10:30, as shown in FIG. 4, the program information control unit 15 acquires the program information about channel M and then transfers the program information to the TS packetizing unit 18 at predetermined intervals of 400 msec after 10:30.

The TS packetizing section 18 then, in step ST3, TS-packetizes the program information into a stream of TS packets and transfers it to the TS packet multiplexor 19 every time the TS packetizing section 18 receives the program information from the program information control section 15. On the other hand, when the PES/TS packetizing section 17 receives media data such as coded video data, coded sound data, and other data, it, in step ST4, packetizes those media data into PES streams, and after that, generates a plurality of TS fixed-length packet streams from those PES streams in step ST5.

In this way, the PES/TS packetizing section 17 transfers the plurality of streams of TS-packetized media data to the TS packet multiplexor 19 and the TS packetizing section 18 transfers the stream of TS-packetized program information to the TS packet multiplexor 19. The TS packet multiplexor 19 then, in step ST6, multiplexes those TS packet streams into a transport stream TS, and furnishes the transport stream TS to outside the apparatus, in step ST7. MPEG-2 Systems can be used as the method of multiplexing the TS packet streams from the PES/TS packetizing section 17 and the TS packetizing section 18. As an alternative, another method can be used.

When during the broadcast of a program, the need for changing either the program information or the transmission control information about the program arises, the information providing unit 11 can accept the change in either the program information or the transmission control information. When the information providing unit 11, in step ST8, receives the change, it notifies the program information generating section 13 of the change.

When the program information generating section 13 is notified of the change by the information providing unit 11, it converts the change in the program information into a transport format defined by either the American ATSC Standard or the Japanese ARIB standard, for example. In the case of changing the transmission control information, the program information generating section 13 only furnishes the change in the transmission control information, just as it is, without converting it into a transport format.

When the program information control section 15 receives either the change in the program information, which has been converted in the predetermined transport format, or the change in the transmission control information, it, in step ST9, refers to the next update time for the program information which is the one part of which has been changed or which is associated with the changed transmission control information, and determines if the next update time comes. When the next update time comes, the program information control section 15, in step ST10, stores the change in either the program information or the transmission control information in the memory 14 (or overwrites the previous program information with the change).

For example, when the program information about channel M is changed at 20:50, the program information about channel M in the memory 14 is updated at 21:00 because the next update time is 21:00. In this case, although the not-yet-updated (or previous) program information and media data are multiplexed by the TS packet multiplexor until 21:00, the updated program information and media data will be multiplexed after 21:00.

The reason why the program information is not updated until the next update time, that is, the program information is updated at the next update time is that if the program information is updated in real time, an allowable change in the program information associated with a program being broadcasted (or on the air), such as a change in the source number of the video or sound, forces the audiences to change the program information such as the source number of the vide or sound, thereby putting a large load on the audiences, which is not appropriate from the viewpoint of broadcast services. The update times for the program information are also the ones when the program currently being broadcasted is changed to another program (see FIG. 3), and there is no program on the air at one update time, where commercials running during programs are not any programs. Therefore, even though the program information such as a source number is updated at one update time, the load imposed on the audiences is small and therefore such a update of the program information at one update time for the program information is not a problem from the viewpoint of broadcast services.

As previously explained, in accordance with the first embodiment of the present invention, the program information transport apparatus is so constructed as to accept a change in either each piece of program information or each piece of transmission control information stored in the memory 14, and update the contents of the memory 14 according to the change. Accordingly, the first embodiment offers the advantage of being able to change either each piece of program information or each piece of transmission control information while continuing to perform a process of multiplexing each piece of program information and media data into a single output stream.

Numerous variants can be made in the exemplary embodiment mentioned above. In a variant of the first embodiment, after the transport end time for each piece of program information, the program information control section 15 finishes the process of transferring each piece of program information to the TS packetizing section 18 and then erases each piece of program information and the transmission control information associated with each piece of program information from the memory. For example, in the case of channel Q as shown in FIG. 5, the program information control section 15 finishes the process of transferring the program information about channel Q to the TS packetizing section 18 and then erases the program information about channel Q and the transmission control information about channel Q stored in the memory after 11:00, because the transport end time for channel Q is set to 11:00. Accordingly, the variant offers the advantage of being able to automatically finish the process of multiplexing the program information about a channel that have not offered any programs, as well as to reduce the storage amount of the memory 14, thereby reducing the size of the memory 14.

In another variant, when some pieces of program information have the same transport time, the program information control section 15 can be so constructed as to sequentially transfer the plurality of pieces of program information to the TS packetizing section 18 in order of transport priority as shown in FIG. 4. For example, when the PMT about channel M, which is a part of the program information about channel M, has the same transport times as the PMT about channel N, the program information control section 15 transfers the PMT about channel N first, and after that, transfers the PMT about channel M because the PMT about channel N has a higher priority (priority "1") than the PMT about channel M (priority "2"). Accordingly, the other variant offers the advantage of being able to transport important program information with first priority.

Figure 6:
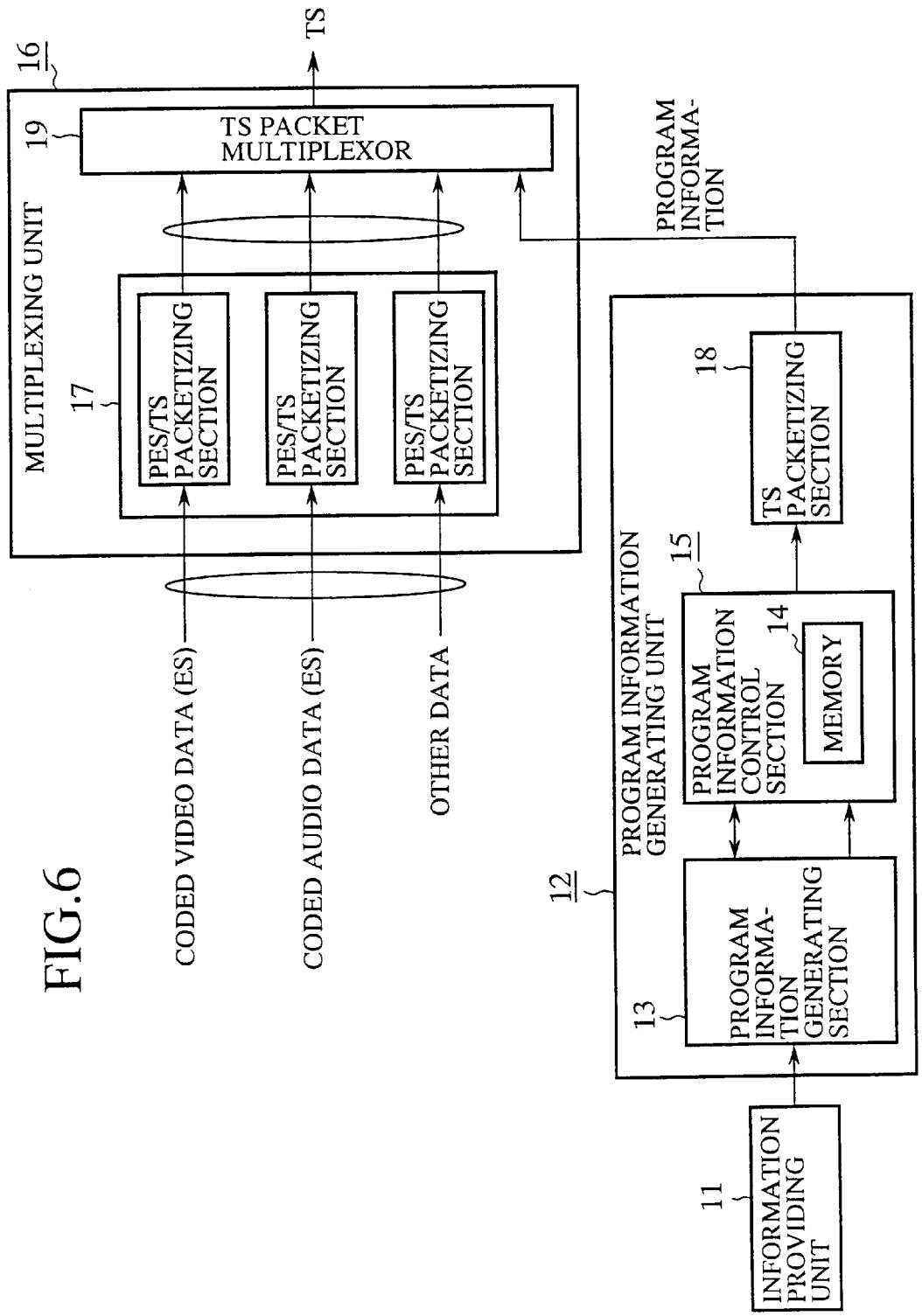
FIG. 6 is a block diagram showing the structure of a program information transport apparatus according to a variant of the first embodiment of the present invention.

In another variant, the TS packetizing section 18 can be disposed within the program information generating unit 12, as shown in FIG. 6, instead of being disposed within the multiplexing unit 16. This variant offers the same advantages as provided by the first embodiment and the other variants mentioned above.

Figure 7:
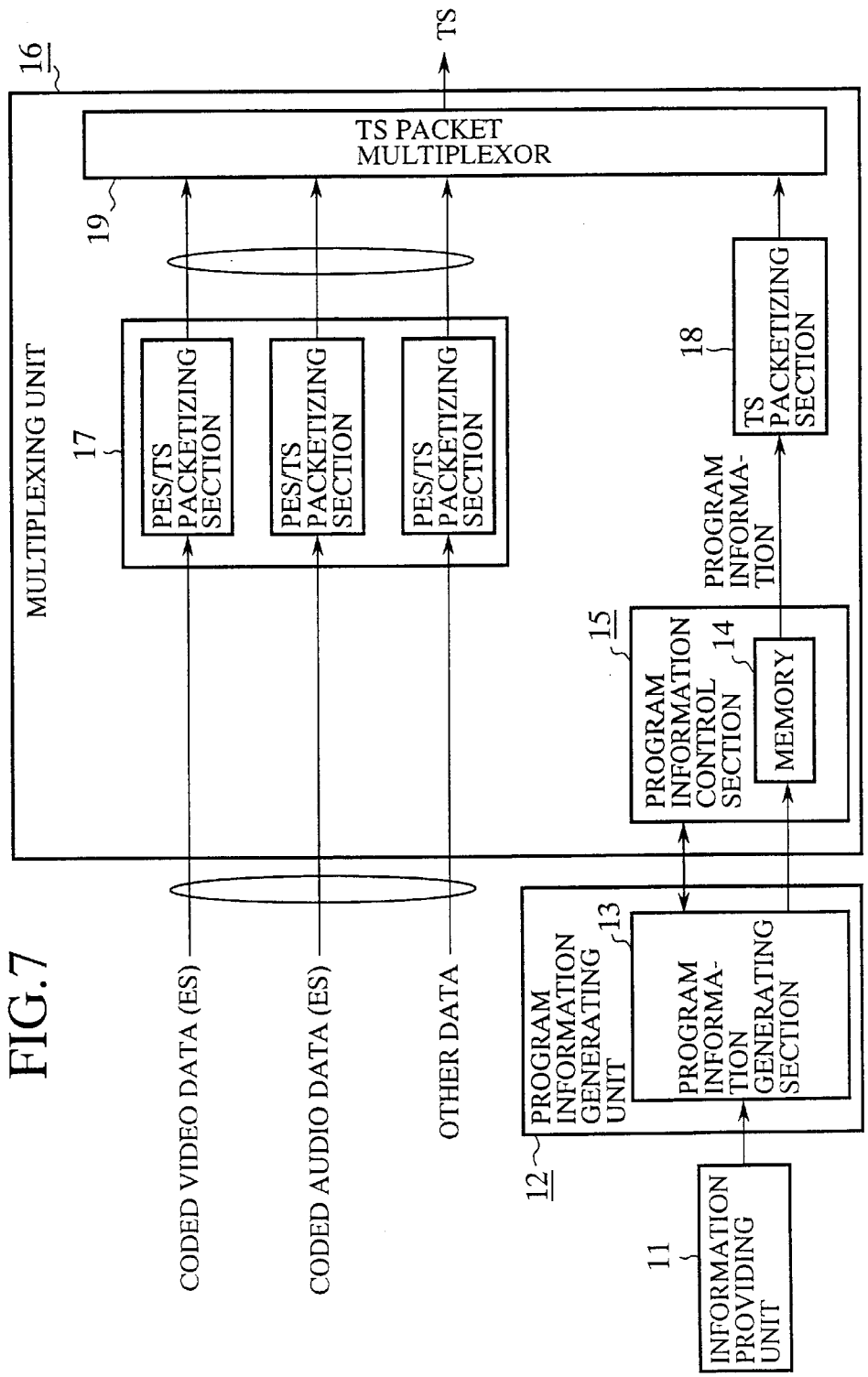
FIG. 7 is a block diagram showing the structure of a program information transport apparatus according to another variant of the first embodiment of the present invention.

In another variant, the program information control section 15 can be disposed within the multiplexing unit 16, as shown in FIG. 7, instead of being disposed within the program information generating unit 12. This variant offers the same advantages as provided by the first embodiment and the other variants mentioned above. Needless to say, the program information generating unit 12 and the multiplexing unit 16 can be integrated into a single unit.

Second Embodiment

Figure 8:
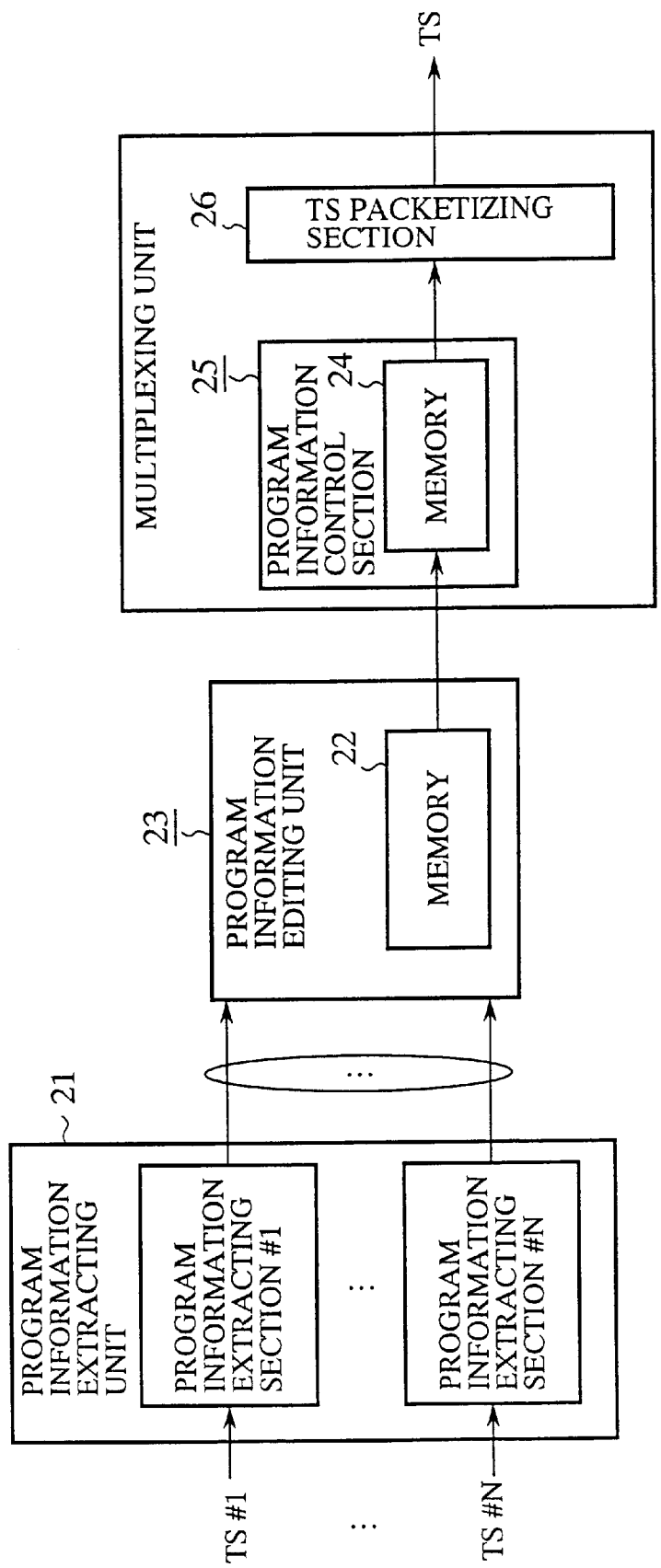
FIG. 8 is a block diagram showing the structure of a program information transport apparatus according to a second embodiment of the present invention.

Referring next to FIG. 8, there is illustrated a block diagram showing the structure of a program information transport apparatus according to a second embodiment. In the figure, reference numeral 21 denotes a program information extracting unit for receiving multiplexed data, including media data and program information, transported thereto from another broadcaster, for extracting the program information from the multiplexed data and determining whether or not there is a change in the extracted program information, and for transferring the extracted program information to a program information editing unit 23 if there is a change in the extracted program information, and 22 denotes a memory for storing the program information that has been extracted and transferred by the program information extracting unit 21, and 23 a program information editing unit for editing the previous program information stored in the memory 22 according to the extracted program information from the program information extracting unit 21 so as to keep the program information stored in the memory 22 up to date.

In addition, reference numeral 24 denotes a memory for storing program information transferred thereto from the program information editing unit 23 as well as the transmission control information associated with the program information, including the transport cycle time for the program information, 25 denotes a program information control section for acquiring the program information from the memory 24 and then transferring the program information to a TS packetizing section 26 at predetermined transport times for the program information, which are preset based on the transport cycle time for the program information. The TS packetizing unit 26 then packetizes the program information from the program information control section 25 into a stream of TS packets, i.e., a transport stream TS, and transports the transport stream TS to outside the apparatus.

The program information transport apparatus according to the second embodiment of the present invention is so constructed as to extract program information from multiplexed data, into which media data and the program information are multiplexed and which are transported thereto from any one of a plurality of other broadcasters, and then transport only the extracted program information. When the program information extracting unit 21 receives multiplexed data that includes media data and program information and that are transported thereto from any one of a plurality of other broadcasters, it extracts the program information included in the multiplexed data. Multiplexed data from any one of a plurality of other broadcasters can include program information that is not the one associated with any media data which the plurality of other broadcasters broadcast. The program information extracting unit 21 does not extract such program information from the multiplexed data. After the program information extracting unit 21 extracts the program information included in the multiplexed data, it determines whether or not there is a change in the extracted program information. To this end, the program information extracting unit 21 compares the extracted program information with the previously-extracted program information, which is stored in a memory (not shown).

Only if there is a change in the extracted program information, that is, only if the extracted program information differs from the previously-extracted program information, the program information extracting unit 21 transfers the extracted program information to the program information editing unit 23, so as to reduce traffic between the program information extracting unit 21 and the program information editing unit 23.

When the program information editing unit 23 receives the extracted (or changed) program information from the program information extracting unit 21, it edits the previous program information stored in the memory 22 according to the changed program information. After the program information editing unit 23 has finished bringing the program information stored in the memory 22 up to date, it transfers the program information to the program information control section 25. The program information editing unit 23 can transfer the program information to the program information control section 25 only when it has edited the program information stored in the memory 22 so as to reduce traffic between the program information editing unit 23 and the program information control section 25.

When the program information control section 25 receives the program information from the program information editing unit 23, it stores the program information in the memory 24. After that, the program information control section 25 acquires the program information from the memory 24 and then transfers the program information to the TS packetizing section 26 at the next predetermined transport time, which is preset based on the transport cycle time for the program information. The transport cycle time that is stored in the memory 24 is preset according to the transport rate for the TS packetizing section 26.

When the TS packetizing section 26 receives the program information from the program information control section 25, it packetizes the program information into a stream of TS packets, i.e., a transport stream TS, and then transports the transport stream TS to outside the apparatus.

As previously explained, in accordance with the second embodiment of the present invention, the program information extracting unit 21 extracts program information from multiplexed data transported thereto from any one of a plurality of other broadcasters, and determines whether or not there is a change in the extracted program information, and the program information editing unit updates the contents of the memory 22 and hence the contents of the memory 24 according to the extracted program information only when there is a change in the program information included in the multiplexed data. Accordingly, the second embodiment of the present invention offers the advantage of being able to transport the latest program information associated with media data from any one of a plurality of other broadcasters.

Figure 9:
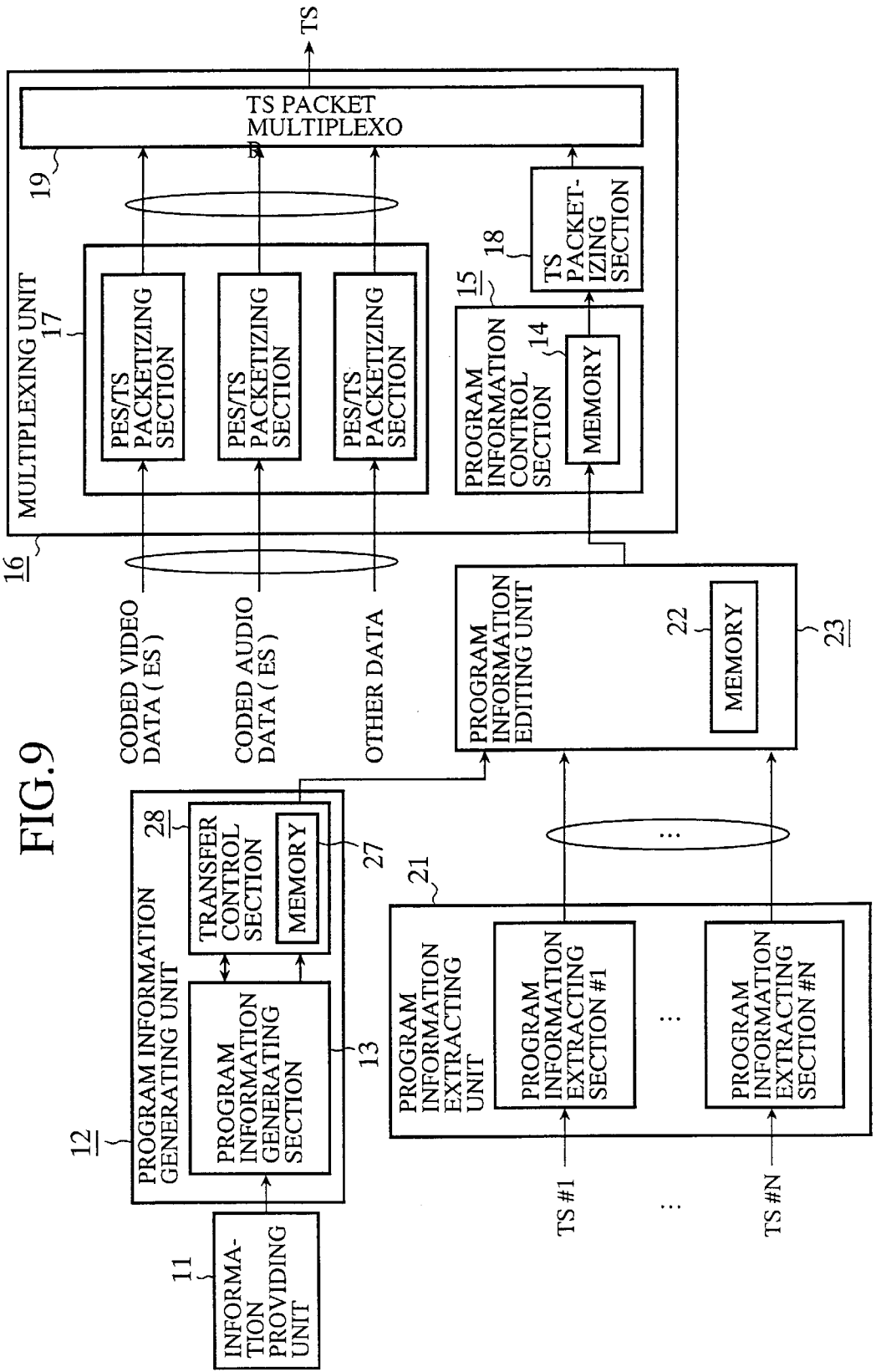
FIG. 9 is a block diagram showing the structure of a program information transport apparatus according to a variant of the second embodiment of the present invention.
Figure 10:
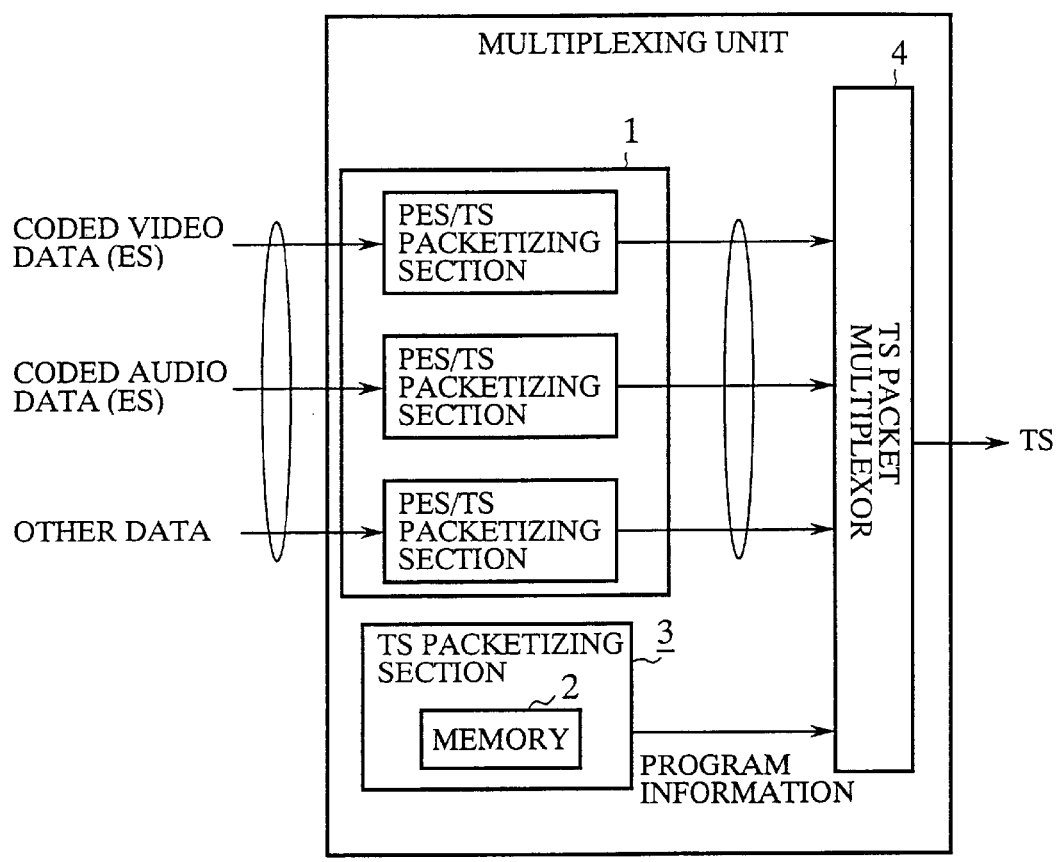
FIG. 10 is a block diagram showing the structure of a prior art program information transport apparatus.

In a variant of the second embodiment mentioned above, the program information transport apparatus can multiplex the program information that has been extracted from multiplexed data transported thereto from any one of a plurality of other broadcasters, and its own media data, and then transport the multiplexed data, instead of transporting only the program information extracted from the multiplexed data, as shown in FIG. 9. This variant can offer the same advantage as provided by the second embodiment mentioned above. In FIG. 9, the same reference numerals as shown in FIG. 1 designate the same components as the above-mentioned first embodiment of the present invention. Further, reference numeral 27 denotes a memory for temporarily storing either program information or transmission control information transferred thereto from the program information generating section 13, and 28 denotes a transfer control unit for transferring either the program information or the transmission control information transferred thereto from the program information generating section 13 to the program information editing unit 23.

Many widely different embodiments of the present invention may be constructed without departing from the spirit and scope of the present invention. It should be understood that the present invention is not limited to the specific embodiments described in the specification, except as defined in the appended claims.

What is claimed is:

1. A program information transport apparatus comprising:
storage means for storing program information about digital broadcast programs as well as transmission control information including a transport cycle time for the program information;
update means for accepting, at a first point of time, a request for a change in either one of the program information and transmission control information stored in said storage means, and for updating, at a second point of time subsequent to the first point of time, the contents of said storage means according to the requested change including all program information requested to be changed only at the next update time in a series of predetermined update times;
information management means for acquiring the program information from said storage means and then furnishing the acquired program information at predetermined transport times to transport said program information, said predetermined transport times being preset based on the transport cycle time stored in said storage means; and transport means for transporting said program information from said information management means to outside said program information transport apparatus, wherein a segment of the non updated program information before the update if not updated, is multiplexed with media data of a digital broadcast during a period between the first point of time and the second point of time and prior to the next update time; and wherein if the segment of the updated program information is updated after the next update time, the updated program information is multiplexed with the media information, which is after the second point of time.

2. The program information transport apparatus according to claim 1, wherein said transport means multiplexes said program information from said information management means and media data into a single output stream, and then transports the single output stream.

3. The program information transport apparatus according to claim 1, wherein said storage means stores, as the transmission control information, predetermined update times to update the program information, a transport start time to start transport of the program information, a transport end time to finish transport of the program information, and a transport priority assigned to the program information, and wherein said update means can accept a request for a change in either one of the predetermined update times, the transport start time, the transport end time, and the transport priority, which are stored in said storage means.

4. The program information transport apparatus according to claim 2, wherein said storage means stores, as the transmission control information, predetermined update times to update the program information, a transport start time to start transport of the program information, a transport end time to finish transport of the program information, and a transport priority assigned to the program information, and wherein said update means can accept a request for a change in either one of the predetermined update times, the transport start time, the transport end time, and the transport priority, which are stored in said storage means.

5. The program information transport apparatus according to claim 3, wherein said information management means starts to transfer the program information to said transport means after the transport start time for the program information.

6. The program information transport apparatus according to claim 3, wherein said information management means finishes transferring the program information to said transport means after the transport end time for the program information.

7. The program information transport apparatus according to claim 6, wherein said information management means erases the program information from said storage means after the transport end time for the program information.

8. The program information transport apparatus according to claim 3, wherein when said storage means stores a plurality of pieces of program information, said information management means sequentially transfers the plurality of pieces of program information to said transport means in order of transport priority if some of the plurality of pieces of program information have to be transported at the same transport times.

9. The program information transport apparatus according to claim 1, further including extracting means for extracting program information from multiplexed data, into which media data and the program information are multiplexed, transported thereto from outside said apparatus, said storage means further storing program information which is the same as program information previously-extracted by said extracting means until said extracting means extracts the current program information, said storage means also storing a transport cycle time for the program information, and second update means for determining whether or not there is a change in the extracted program information by comparing the extracted program information with the previous program information, and for updating the contents of said storage means according to the program information extracted by said extracting means only if there is a change in the extracted program information, wherein said information management means acquires the program information from said storage means and then furnishes the acquired program information to said transport means at predetermined transport times to transport said program information, said predetermined transport times being preset based on the transport cycle time stored in said storage means.

10. A method of transporting program information, comprising the steps of:

presorting program information about digital broadcast programs and transmission control information including a transport cycle time for the program information in a memory;

accepting, at a first point of time, a request for a change in either one of the program information and the transmission control information stored in said memory;

updating, at a second point of time subsequent to the first point of time, the contents of said memory according to the requested change including all program information requested to be changed only at the next update time in a series of predetermined update times;

acquiring the program information from said memory and then multiplexing the acquired program information and media data into an output stream at predetermined transport times to transport said program information, said predetermined transport times being preset based on said transport cycle time; and transporting said output stream to outside, wherein a segment of the non updated program information if not updated, is multiplexed with the media data during a period between the first point of time and the second point of time and prior to the next update time; and wherein if the segment of the updated program information is updated after the next update time, the updated program information is multiplexed with the media information, which is after the second point of time.

* * * * *

UNITED STATES PATENT AND TRADEMARK OFFICE
CERTIFICATE OF CORRECTION

PATENT NO. : 6,782,553 B1
DATED : August 24, 2004
INVENTOR(S) : Michiyo Ogawa et al.

It is certified that error appears in the above-identified patent and that said Letters Patent is hereby corrected as shown below:

Column 12,
Lines 26-59, should read as follows:
10. A method of transporting program information, comprising the steps of:
presorting program information about digital broadcast programs and transmission control information including a transport cycle time for the program information in a memory;
accepting, at a first point of time, a request for a change in either one of the program information and the transmission control information stored in said memory;
updating, at a second point of time subsequent to the first point of time, the contents of said memory according to the requested change including all program information requested to be changed only at the next update time in a series of predetermined update times;
acquiring the program information from said memory and then multiplexing the acquired program information and media data into an output stream at predetermined transport times to transport said program information, said predetermined transport times being preset based on said transport cycle time; and transporting said output stream to outside,
wherein a segment of the program information if not updated, is multiplexed with the media data during a period between the first point of time and the second point of time and prior to the next update time; and
wherein if the segment of the updated program information is updated after the next update time, the updated program information is multiplexed with the media information, which is after the second point of time.

Signed and Sealed this

Twenty-second Day of March, 2005

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,782,553 B1 | |
| APPLICATION NO. | : 09/258826 | |
| DATED | : August 24, 2004 | |
| INVENTOR(S) | : Michiyo Ogawa et al. | |

It is certified that error appears in the above-identified patent and that said Letters Patent is hereby corrected as shown below:

Column 12,
Lines 26-59, should read as follows:
10. A method of transporting program information, comprising the steps of:
presorting program information about digital broadcast programs and transmission control information including a transport cycle time for the program information in a memory;
accepting, at a first point of time, a request for a change in either one of the program information and the transmission control information stored in said memory;
updating, at a second point of time subsequent to the first point of time, the contents of said memory according to the requested change including all program information requested to be changed only at the next update time in a series of predetermined update times;
acquiring the program information from said memory and then multiplexing the acquired program information and media data into an output stream at predetermined transport times to transport said program information, said predetermined transport times being preset based on said transport cycle time; and transporting said output stream to outside,
wherein a segment of the program information if not updated, is multiplexed with the media data during a period between the first point of time and the second point of time and prior to the next update time; and
wherein if the segment of the updated program information is updated after the next update time, the updated program information is multiplexed with the media information, which is after the second point of time.

Please correct the claims as follows:
Claim 1. A program Information transport apparatus comprising:
storage means for storing program information about digital broadcast programs as well as transmission control information including a transport cycle time for the program information;
update means for accepting, at a first point of time, a request for a change in either one of the program information and transmission control information stored in said storage means, and for updating, at a second point of time subsequent to the first point of time, the contents of said storage means according to the requested change including all program information requested to be changed only at the next update time in a series of predetermined update times;

UNITED STATES PATENT AND TRADEMARK OFFICE
CERTIFICATE OF CORRECTION

PATENT NO.         : 6,782,553 B1
APPLICATION NO. : 09/258826
DATED                 : August 24, 2004
INVENTOR(S)       : Michiyo Ogawa et al.

It is certified that error appears in the above-identified patent and that said Letters Patent is hereby corrected as shown below:

Claim 1...comprising (cont'd):
    information management means for acquiring the program information from said storage means and then furnishing the acquired program information at predetermined transport times to transport said program information, said predetermined transport times being preset based on the transport cycle time stored in said storage means; and
    transport means for transporting said program information from said information management means to outside said program information transport apparatus,
    wherein a segment of the ~~non-updated~~ program information ~~before the update~~ if not updated, is multiplexed with media data of a digital broadcast during a period between the first point of time and the second point of time and prior to the next update time; and
    wherein if the segment of the ~~updated~~ program information is updated after the next update time, the updated program information is multiplexed with the media information, which is after the second point of time.

This certificate supersedes Certificate of Correction issued March 22, 2005.

Signed and Sealed this

Fourth Day of September, 2007

JON W. DUDAS
*Director of the United States Patent and Trademark Office*